US009036622B2

(12) United States Patent
Xie (10) Patent No.: US 9,036,622 B2
(45) Date of Patent: May 19, 2015

(54) MEDIA NEGOTIATION METHOD FOR IP MULTIMEDIA LINK (75) Inventor: Zhenhua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 960 days.

(21) Appl. No.: 13/062,519

(22) PCT Filed: Dec. 17, 2008

(86) PCT No.: PCT/CN2008/073561
§ 371 (c)(1),
(2), (4) Date: Mar. 7, 2011

(87) PCT Pub. No.: WO2010/031230
PCT Pub. Date: Mar. 25, 2010

(65) Prior Publication Data
US 2011/0164613 A1 Jul. 7, 2011

(30) Foreign Application Priority Data

Sep. 19, 2008 (CN) .......................... 2008 1 0149051

(51) Int. Cl.
H04L 29/06 (2006.01)
H04L 29/08 (2006.01)
(52) U.S. Cl.
CPC ........ H04L 65/1016 (2013.01); H04L 65/1006 (2013.01); H04L 65/1063 (2013.01); H04L 65/1069 (2013.01); H04L 67/303 (2013.01); H04L 69/28 (2013.01); H04L 69/24 (2013.01)
(58) Field of Classification Search
USPC ....................................................... 370/352
See application file for complete search history.

(56) References Cited

U.S. PATENT DOCUMENTS 8,406,156 B2 * 3/2013 Saha et al. ..................... 370/260
8,599,831 B2 * 12/2013 Shen et al. ..................... 370/352

(Continued)

FOREIGN PATENT DOCUMENTS

CN 101217600 A 7/2008
CN 101247440 A 8/2008

(Continued)

OTHER PUBLICATIONS

Rosenberg et al., Best Current Practices for Third Party Call Control (3pcc) in the Session Initiation Protocol, Apr. 2004, RFC 3725, pp. 1-32.*

(Continued)

Primary Examiner — Nicholas Jensen
(74) Attorney, Agent, or Firm — Oppedahl Patent Law Firm LLC (57) ABSTRACT A media negotiation method for an IP multimedia link is used in the process of establishing an IP multimedia link between a first entity and a second entity via an application server (AS) of an IP multimedia subsystem (IMS). AS sends the second entity an invite message, which includes media resource information of the first entity; When AS receives a message with media resource information from the second entity before an answer message is received or after it receives a response message with media resource information from the second entity, AS sends an IMS re-invite message without media source information to the first entity; the AS, after receiving the IMS signaling message with media resource information from the first entity, sends the first entity the media resource information returned by the second entity. The present invention is applicable to an IMS centralized service and may effectively reduce the number of steps and the time required after response for media resource re-negotiation.

20 Claims, 6 Drawing Sheets

(56) References Cited

U.S. PATENT DOCUMENTS

| | | | |
|---|---|---|---|
| 2006/0227728 A1* | 10/2006 | Baumann | 370/260 |
| 2007/0071216 A1* | 3/2007 | Shen et al. | 379/221.08 |
| 2007/0172051 A1* | 7/2007 | Hoffmann | 379/360 |
| 2007/0242628 A1* | 10/2007 | Dutta et al. | 370/310 |
| 2007/0274289 A1 | 11/2007 | Buckley et al. | |
| 2008/0062863 A1* | 3/2008 | Ginde | 370/221 |
| 2008/0080480 A1 | 4/2008 | Buckley et al. | |
| 2008/0267171 A1 | 10/2008 | Buckley et al. | |
| 2009/0252153 A1 | 10/2009 | Choi et al. | |
| 2009/0262908 A1 | 10/2009 | Choi et al. | |
| 2011/0225307 A1* | 9/2011 | George et al. | 709/227 |

FOREIGN PATENT DOCUMENTS

| | | |
|---|---|---|
| EP | 1909455 A1 | 4/2008 |
| WO | 2007142447 A1 | 12/2007 |

OTHER PUBLICATIONS

Notification of the First Office Action of Chinese application No. 200810149051.5, issued on Mar. 23, 2011.

Supplementary European Search Report in European application No. 08876963.3, mailed on Dec. 1, 2011.

International Search Report in international application No. PCT/CN2008/073561, mailed on Jul. 2, 2009.

English Translation of the Written Opinion of the International Search Authority in international application No. PCT/CN2008/073561, mailed on Jul. 2, 2009.

Session Description Protocol, Jul. 2006.

* cited by examiner

MEDIA NEGOTIATION METHOD FOR IP MULTIMEDIA LINK

TECHNICAL FIELD

The present invention relates to the field of communications, and more particularly, relates to a media negotiation method for an IP multimedia link.

BACKGROUND

An IP (internet protocol) multimedia core network subsystem (IMS) is an IP-based network architecture proposed by the 3rd generation partnership project (3GPP), which constructs an open and flexible service environment, supports multimedia applications, and can provide users with abundant multimedia services.

In an IMS service system, a control layer and a service layer are separated. The control layer does not provide specific services, but only provides the service layer with necessary functions such as trigger, routing, charging, etc. The service trigger and control function of the control layer is accomplished by a call session control function (CSCF, categorized into three types as follows: Proxy, Interrogating, and Serving, wherein the Serving plays a major role, and the Interrogating is optional). The service layer is composed of a series of application servers (ASs) and can provide specific services. The AS may be an independent entity or exists in an S-CSCF. The control layer (S-CSCF), according to subscription information of users, controls service trigger and calls services of the AS, so as to implement service functions. The AS and the S-CSCF may be generally called a server equipment (SE). An end-to-end equipment in a session is called a user equipment (UE), responsible for interaction with a user. All the traditional UEs support a circuit switch (CS) network protocol, and all of these CS terminals interact with an IMS network via an IMS network gateway. Since it requires a process to completely upgrade a UE to support an IMS network protocol, some UEs, which may have a limited capability of supporting an IMS protocol, can only support an IMS signaling protocol, but can not support an IMS media protocol; if the UE can also support a CS network protocol, then a medial channel may be provided via the CS network, and such UE is called an IMS centralized service UE (ICS UE). The interaction between the IMS network and the CS network is implemented through a conversion gateway of the IMS network or via a mobile switch center enhanced (MSCe) of the CS network in the IMS centralized service, or may also be implemented by cooperation of the conversion gateway and the MSCe. The part responsible for signaling conversion in the conversion gateway of the IMS network is called a media gateway control function (MGCF), and the part responsible for media conversion is called a media gateway (MGW). The cooperation between the MSCe and the conversion gateway of the IMS network refers to cooperation between the MSCe and the media gateway (MGW) in the conversion gateway of the IMS network, and at this point, the MSCe is similar to the MGCF.

An ultimate objective for a session is to realize media connection, and thus it is necessary to negotiate media resource information in the session. The protocol for negotiating the media resource information in the IMS system is called an SDP (session description protocol). The interaction manner of the protocol is a request-response mode, i.e., one SDP response is necessary for one SDP request, and contents of the SDP request and response are both media resource information comprising media owner information (including address information), media connection address, media type and, media type-related media port and codec information, etc.; in the content of the SDP response, the media quantity, type, and sequence are required to be completely identical to the media quantity, type and sequence in the SDP request. The content of the SDP is included in a message body of a session initialization protocol (SIP), and an interaction process is independent from the request-response mode of the SIP, i.e., a SIP request or response message may include an SDP request, or may include an SDP response, or may not include SDP protocol content.

The IMS centralized service provides a uniform IMS service platform for a traditional user terminal or a terminal merely supporting the IMS signaling protocol, so that various service logics of the user and user information are uniformly provided and recorded via the IMS network. An IMS transfer service enables a user, on the basis that there is already a call, to accept a transfer request of a call counterpart to initiate a call to a third party.

Figure 1:
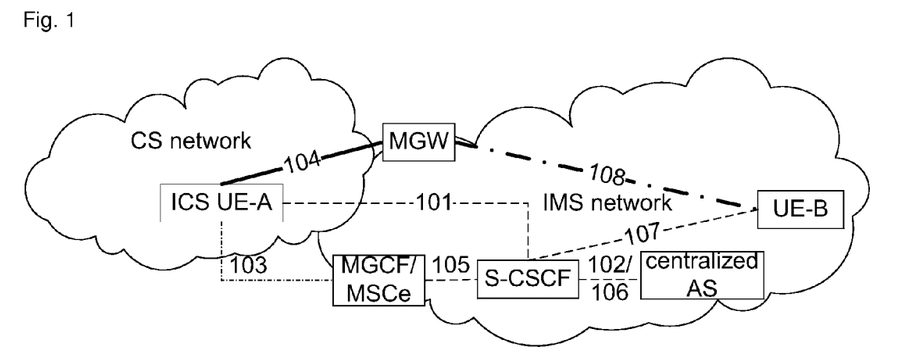
FIG. 1 shows a network architecture diagram of an IMS centralized service.

FIG. 1 is a network architecture diagram of an IMS centralized service, illustrating a signaling path for an IMS centralized service terminal ICS UE-A to call an IMS terminal UE-B and a media path for a call between the ICS UE-A and the UE-B after the UE-B responds, the process of which is as follows:

step 101: the ICS UE-A calls the UE-B via the IMS signaling protocol, and a signaling message reaches the S-CSCF;

step 102: the S-CSCF, according to a service trigger rule, sends the signaling message to a centralized-service AS; the AS determines that a calling user cannot establish an IMS media channel, then the AS sends an IMS signaling message to the ICS UE-A to ask it to call a special number over a CS network; through network configuration, signaling of the CS network for calling the special number will be inevitably routed to the AS, and the AS may associate with the call in 102 according to the special number, and the message reaches the ICS UE-A along the paths of 102 and 101;

step 103: the ICS UE-A initiates a call to the special number through a CS signaling protocol, and a signaling message reaches the MGCF or MSCe;

step 104: the MGCF or MSCe informs the MGW to establish a CS media link between the ICS UE-A and the MGW;

step 105: the MSCF or MSCe converts the CS signaling protocol to the IMS signaling protocol, and sends it together with media resource information of the MGW to the S-CSCF;

step 106: the S-CSCF, according to a service trigger rule, sends a signaling message to the centralized AS;

step 107: the centralized AS, according to the special number in the signaling message, associates with the signaling message in step 102, thereby obtaining information about the UE-B which is a true called party, and then forwards the signaling message to the UE-B, the message firstly reaching the S-CSCF along 106, and then being forwarded to the UE-B by the S-CSCF;

step 108: after the UE-B answers the call, a media link between the UE-B and the MGW is established, and the MGW implements a call between the ICS UE-A and the UE-B through switching between the IMS media protocol and the CS media protocol.

Figure 2:
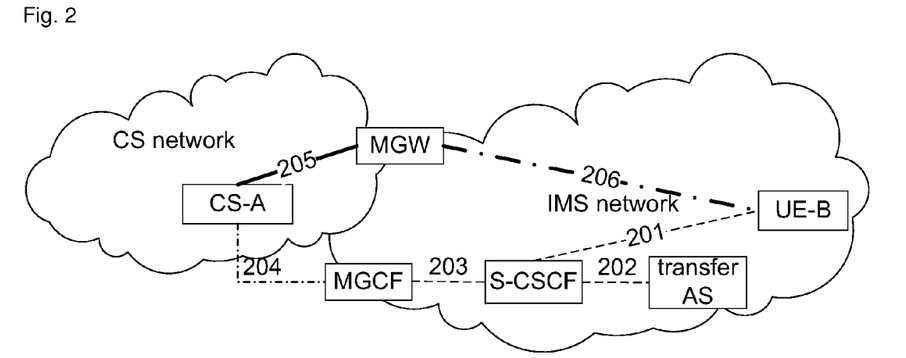
FIG. 2 shows a network architecture diagram of establishing a call between a CS network terminal and an IMS network terminal.

FIG. 2 is a network architecture diagram of establishing a call between a CS network terminal and an IMS network terminal, illustrating a signaling path for the IMS terminal UE-B calling the CS terminal CS-A and a media path for a call between the CS-A and the UE-B after the CS-A responds, the process of which is as follows:

step 201: the UE-B initiates a call to the CS-A via the IMS signaling protocol, and a signaling message reaches the S-CSCF;

step 202: the S-CSCF, according to a service trigger rule, sends the signaling message to a transfer-service AS;

step 203: the transfer-service AS forwards the signaling message to the CS-A, the message firstly reaching the S-CSCF along 202 and then being forwarded to the CS-A by the S-CSCF; since the CS-A is a terminal of the CS network, the IMS signaling message finally reaches the MGCF;

step 204: the MGCF converts the IMS signaling protocol to the CS signaling protocol and sends it to the CS-A;

step 205: the CS-A answers the call, and the MGCF informs the MGW to establish a CS media link between the CS-A and the MGW;

step 206: the MGCF converts the response message of the CS signaling protocol to a response message of the IMS signaling protocol, and sends it together with media resource information of the MGW to the UE-B along the reverse path of the calling message, thereby a media link between the UE-B and the MGW is established, and the MGW implements a call between the CS-A and the UE-B through switching between the IMS media protocol and the CS media protocol.

Hereinafter, for the convenience of graph drawing and depiction, the AS and the S-CSCF are represented as a same entity, the interaction between them is implemented through a standard IMS signaling flow; the MSCe and the conversion gateway of the IMS network are represented as a same entity, because their functions are quite similar, except that the MSCe is a CS network device, while the MGCF and the MGW (MGCF/MGW) are IMS network devices.

Figure 3:
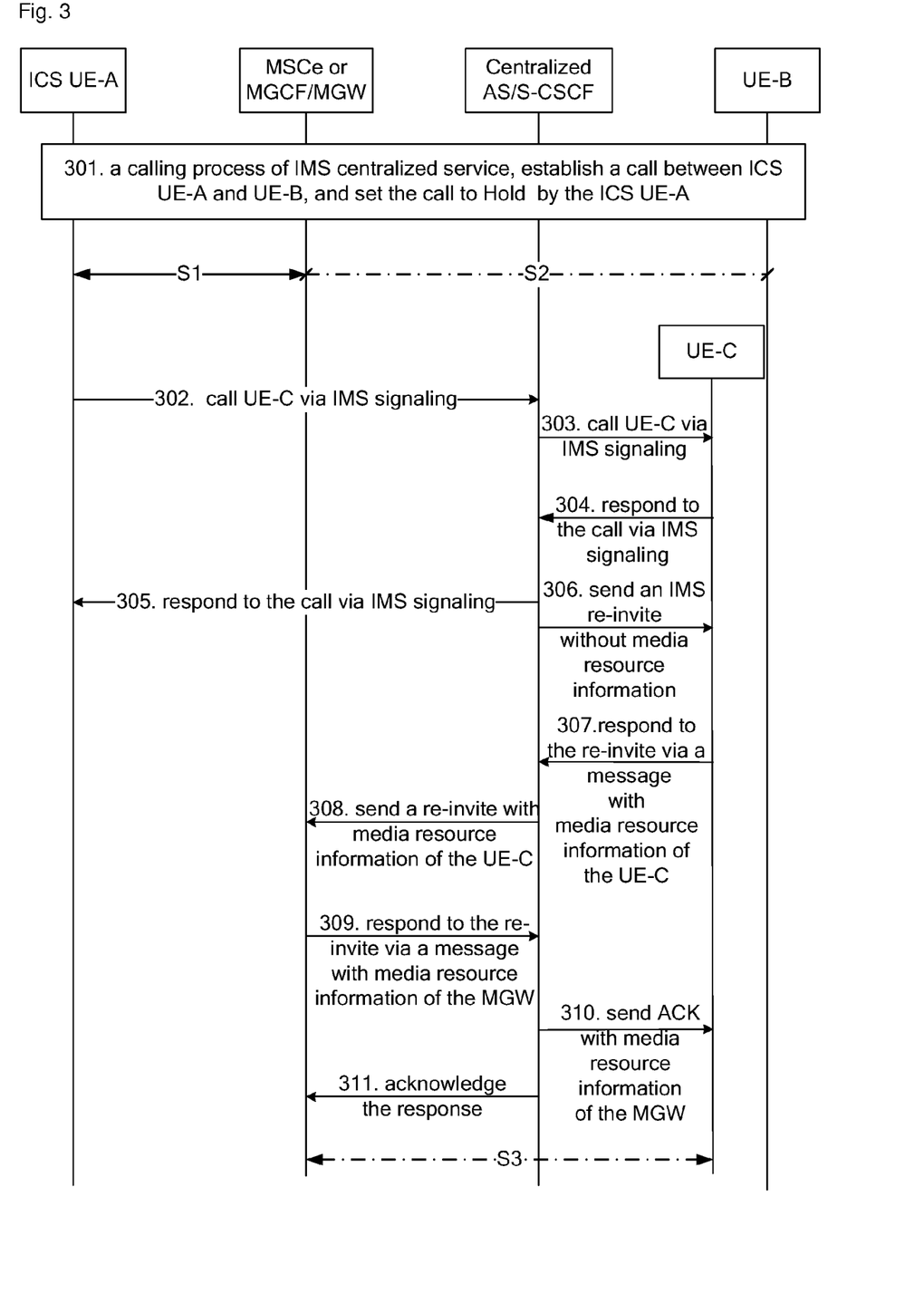
FIG. 3 shows a prior art flow chart of connecting an IMS centralized service with an existing CS media link.

FIG. 3 shows a prior art flow chart of connecting an IMS centralized service with an existing CS media link, which depicts that an ICS UE-A already has a CS media contact, for example, having established a call with a UE-B, and then it is necessary to establish a new media link to connect the existing CS media link, for example, re-calling a UE-C, steps of which are as follows:

step 301: the ICS UE-A establishes a call connection with the UE-B according to a standard IMS centralized service process, the connection comprising two media links, one being a CS media link 51 between the ICS UE-A and the MSCe or MGW, and one being a media link S2 between the MSCe or MGW and the UE-B; in order to initiate a new call, the ICS UE-A sets the call with the UE-B to a hold state, which results in that the media link S2 has no media data to transmit;

step 302: the ICS UE-A initiates a new call to the UE-C via IMS signaling, for example, sending an INVITE message, the message passing through the S-CSCF, and being forwarded to an AS by the S-CSCF according to a service trigger rule;

step 303: the centralized-service AS finds that the calling user of the call is an ICS UE and there is already a call connection, then changes the media resource information in the call message into the media resource information of the MSCe or MGW in the existing call connection, and then forwards the call message;

step 304: the UE-C responds to the call, for example, sending a "200 OK" message of the IMS, the message including the media resource information of the UE-C and reaching the centralized-service AS via the S-CSCF;

step 305: the centralized-service AS receives the response message, and after modifying the media resource information therein according to a standard process, forwards it to the ICS UE-A;

step 306: the centralized-service AS sends a re-invite message to the UE-C, for example, sending a re-INVITE message, the message body including no media resource information; the re-INVITE message includes a session identification corresponding to a media link S3 which is to be newly established (or S3-related session identification), thereby enabling the UE-C to return media resource information for establishing the S3 media link; herein, S1 is a circuit switch link, S2 and S3 are IP multimedia links, i.e., IMS media links, which are also briefly called herein as media link S2 and media link S3, respectively;

step 307: the UE-C responds to the re-INVITE message, for example, sending a "200 OK" message, the message body including media resource information of the UE-C;

herein, in step 304, the media resource information of the UE-C has already been sent to the AS, and through steps 306 and 307, the AS is capable of sending the modified media resource information of the MSCe or MGW in a response manner to the UE-C in step 310, thereby preventing the UE-C from modifying the resource used by S3;

step 308: the centralized-service AS receives the response message, and then sends a re-invite message to the MSCe or MGCF, for example, sending a re-INVITE message, the message body including the media resource information of the UE-C, and the re-INVITE message including a session identification corresponding to the media link S2, thereby enabling the MSCe or MGCF to update media resource information of the media link S2;

step 309: the MSCe or MGCF responds to the re-INVITE message, for example, sending a "200 OK" message, the message body including the modified media resource information of the MSCe or MGW;

step 310: the AS receives the response message and sends a response acknowledgement message to the UE-C, for example, sending an ACK (acknowledgement) message, the message body including the modified media resource information of the MSCe or MGW;

step 311: meanwhile, the AS sends a response acknowledgement message to the MSCe or MGCF, for example, sending an ACK message.

Till now, a call connection may be established between the ICS UE-A and the UE-C, the call connection comprising two media links, one being an existing CS media link 51, the other being a new media link S3. Since the existing media link S2 is replaced by S3, the MSCe/MGCF/MGW can correctly connect 51 and S3. The MSCe/MGCF controls, according to the received UE-C media resource information, the MGW to replace the media link S2 with the new media link S3 between the MGW and the UE-C.

Figure 4:
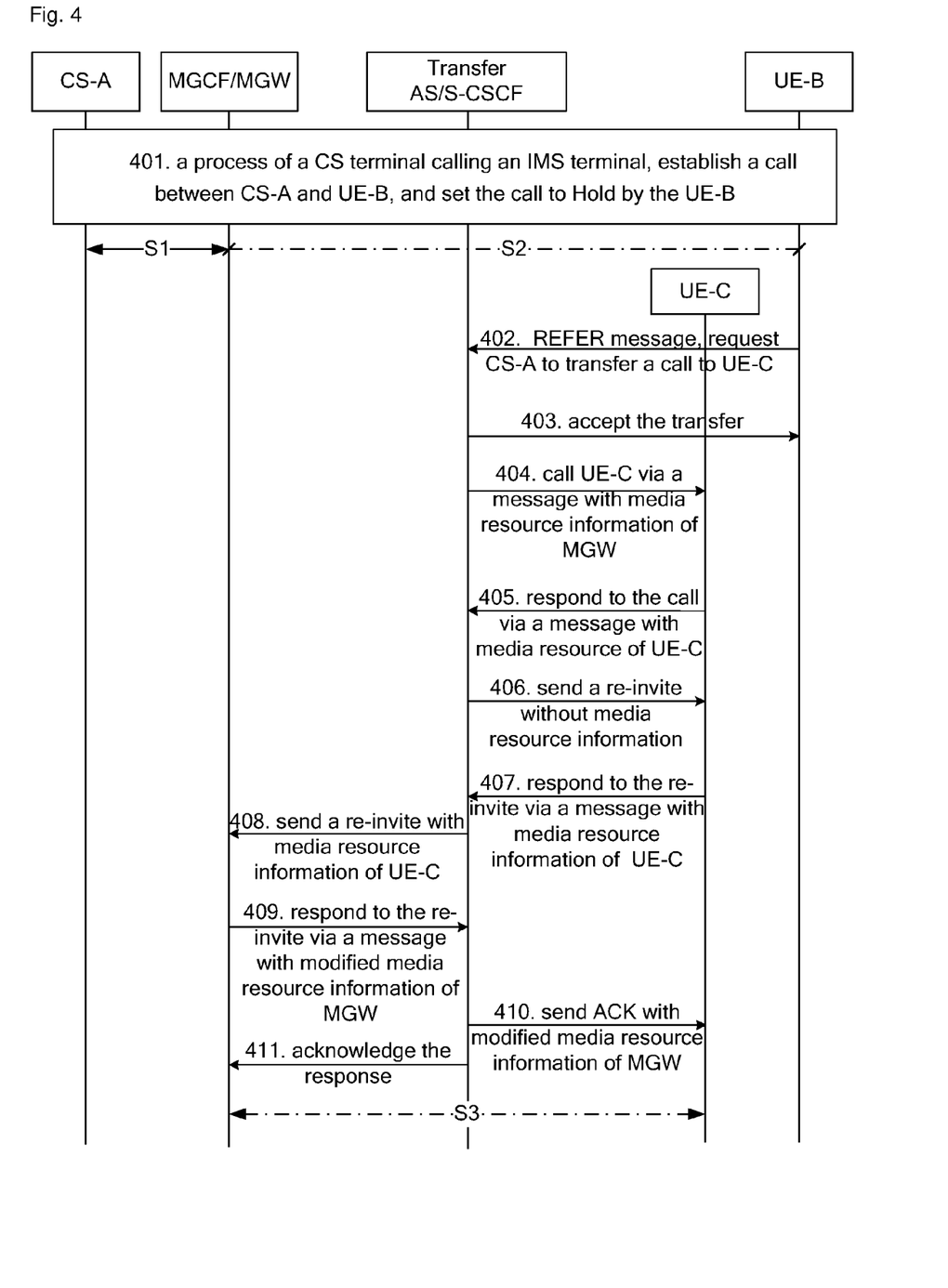
FIG. 4 shows a prior art flow chart of connecting a transfer service with an existing CS media link.

FIG. 4 shows a prior art flow chart of connecting a transfer service with an existing CS media link, which depicts that a CS terminal CS-A already has a CS media contact, for example, having established a call with a UE-B, and then the UE-B requests the CS-A to transfer to call a third-party user UE-C, thereby it is necessary to establish a new media link to connect the existing CS media link, steps of which are as follows:

step 401: the UE-B establishes a call connection with the CS-A according to a standard IMS call process, the connection comprising two media links, one being a CS media link 51 between the CS-A and the MGW, and the other being a media link S2 between the MGW and the UE-B; in order to initiate a new call, the UE-B sets the call communicating with the CS-A to a hold state, which results in that the media link S2 has no media data to transmit;

step 402: the UE-B initiates a transfer request to the CS-A, for example sending an REFER (transfer) message, and requests the CS-A to call the UE-C, for example, setting a value of the "Refer-To" header of the REFER message as the identification of the UE-C; the message reaches the transfer-service AS via the S-CSCF;

step 403: the transfer-service AS determines that a recipient of the transfer request is a CS network terminal, and then returns a transfer accept message to the UE-B, for example, sending a "202 Accepted" message, the message reaching the UE-B via the S-CSCF;

step 404: the transfer-service AS initiates a call to the UE-C, for example, sending an INVITE message, and sets the media resource information in the call message as the media resource information of the MGW in an existing call connection, the message reaching the UE-C via the S-CSCF;

step 405: the UE-C responds to the call, for example, sending a "200 OK" message, the message body including the media resource information of the UE-C and reaching the transfer-service AS via the S-CSCF;

step 406: the transfer-service AS sends a re-invite message to the UE-C, for example, sending a re-INVITE message, the message body including no media resource information, the message reaching the UE-C via the S-CSCF; the re-INVITE message includes a session identification corresponding to a media link S3 which is to be newly established, thereby enabling the UE-C to return media resource information for establishing the S3 media link;

step 407: the UE-C responds to the re-INVITE message, for example, sending a "200 OK" message, the message body including the media resource information of the UE-C, the message reaching the transfer-service AS via the S-CSCF;

step 408: the transfer-service AS receives the response message, and then sends a re-invite message to the CS-A via the MGCF, for example, sending a re-INVITE message, the message body including the media resource information of the UE-C, and the message reaching the MGCF via the S-CSCF; the re-INVITE message includes a session identification corresponding to the media link S2, thereby enabling the MGCF to update media resource information of the media link S2;

step 409: the MGCF responds to the re-INVITE message, for example, sending a "200 OK" message, the message body including the modified media resource information of the MGW, the message reaching the transfer-service AS via the S-CSCF;

step 410: the transfer-service AS receives the response message and sends a response acknowledgement message to the UE-C, for example, sending an ACK (acknowledgement) message, the message body including the modified media resource information of the MGW, the message reaching the UE-C via the S-CSCF;

step 411: meanwhile, the transfer-service AS sends a response acknowledgement message to the CS-A, for example, sending an ACK message, the message reaching the MGCF via the S-CSCF.

Till now, a call connection can be established between the CS-A and the UE-C, the call connection comprising two media links, one being an existing CS media link 51, the other being a new media link S3. Since the existing media link S2 is replaced by S3, the MGCF/MGW can correctly connect 51 and S3.

For the prior art method for connecting a newly established media link to an existing CS media link, after a user responds, i.e., after step 304 or 405, more steps are required to perform media resource re-negotiation before actually realizing a session, which particularly requires participation of a third-party user which very likely belongs to a different network and involves a longer transmission path, thereby resulting in a bad user experience.

SUMMARY

The present invention provides a method for connecting an existing circuit switching link with an IP multimedia link, which is used for an IMS centralized service and may effectively reduce steps and time required after response for media resource re-negotiation.

In order to solve the above technical problem, the present invention provides a media negotiation method for an IP multimedia link, applicable to a process of establishing an IP multimedia link between a first entity and a second entity through an application server (AS) of an IP multimedia subsystem (IMS), the media negotiation method comprising:

said As sends said second entity an invite message, which includes media resource information of said first entity;

said AS, after receiving a message with media resource information from said second entity before an answer message is received or receiving a response message with media resource information from said second entity, sends an IMS re-invite message without media source information to said first entity; and said AS, after receiving an IMS signaling message with media resource information from said first entity, sends said first entity the media resource information returned by said second entity.

Further, said media negotiation method may have said following characteristics: said media negotiation method is triggered under said following circumstances:

a first terminal serviced by said first entity firstly establishes a call link with other terminal through said AS, the call link comprising an IP multimedia link S2 between said first entity and said other terminal, and afterwards, said first terminal further calls said second entity through said AS so as to establish a three-party conference, or said other terminal initiates an IMS transfer service or a transfer service in an IMS centralized service to said second entity, and replaces the IP multimedia link S2 as an IP multimedia link between said first entity and said second entity, thereby triggering said AS to perform the media negotiation.

Further, the above media negotiation method may further have the following characteristics:

said second entity is a second terminal, and the invite message sent to said second terminal from said AS is a call message which includes media resource information of said first entity, and said AS obtains the media resource information of said second terminal from the response message sent by said second terminal; the media resource information of said first entity as included in said call message is media resource information of said first entity for an IP multimedia link S2 as recorded by said AS during the call establishment process between said first terminal and said other terminal.

Further, the above media negotiation method may further have the following characteristics:
said AS makes an identification of said IP multimedia link S2 included in the re-invite message sent to said first entity;
said first entity, after receiving said re-invite message, sends said AS a re-invite response message, including the media resource information of said first entity being used by said IP multimedia link S2; and
said AS, after receiving said re-invite response message, sends said first entity a response acknowledgement message, including media resource information of said second terminal.

Further, the above media negotiation method may further have the following characteristics:
said first entity is an entity having a gateway and a gateway control function, where the gateway control function part for performing message interaction with said AS is implemented by a mobile switch center enhanced (MSCe) or a Media Gateway Control Function MGCF, and the media resource information of said first entity is media resource information of the gateway part.

In order to solve the above technical problem, the present invention further provides a media negotiation method for an IP multimedia link, applicable to a process of establishing an IP multimedia link between a first entity and a second entity through an AS of an IMS, the media negotiation method comprising:
said AS sends said second entity an invite message, which includes media resource information of said first entity, and sending said first entity an IMS re-invite message without media source information;
said AS, after receiving an IMS signaling message with media resource information from said first entity, initializes and starts a timer, or initializes a counter for recording the number of said IMS signaling messages with media resource information which are retransmitted by said first entity;
said AS, each time when timeout occurs to said timer or a count value of said counter reaches or exceeds a designated limit value, sends an IMS signaling message with media resource information to said first entity, and then further sends a re-invite message without media resource information to said first entity, and after receiving the IMS signaling message with media resource information from said first entity, initializes and starts said timer or initializing said counter; and
said AS, after receiving a message with media resource information from said second entity before an answer message is received or receiving a response message with media resource information from said second entity, sends said first entity an IMS signaling message with the media source information returned by said second entity.

Further, the above media negotiation method may further have the following characteristics:
when said AS receives the message with media resource information from said second entity before an answer message is received or receives the response message with media resource information from said second entity, if upon the latest time of receiving an IMS signaling message from said first entity, timeout has not occurred to the initialized and started timer, or a count value of the initialized counter has not reached or exceeded a designated limit value, then said AS directly sends said first entity an IMS signaling message with the media resource information returned by said second entity and stops timing or counting; otherwise, after receiving the IMS signaling message with media resource information sent again by said first entity, said AS sends said first entity the media resource information returned by said second entity, and will not initialize and start said timer or will not initialize said counter any more;
wherein, the timing time of said timer is shorter than the overtime of said first entity waiting for said AS to send an IMS signaling message with media resource information, and the designated limit value of said timer is smaller than or equal to the number of IMS signaling messages with media resource information retransmitted before said first entity waits overtime.

Further, the above media negotiation method may further have the following characteristics: the media negotiation method is triggered under the following circumstances:
a first terminal serviced by said first entity firstly establishes a call link with other terminal via said AS, said call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

Further, the above media negotiation method may further have the following characteristics:
the re-invite message without media resource information each time sent by said AS to said first entity includes a session identification of said IP multimedia link S2;
before said AS receives a message with media resource information from said second entity before an answer message is received or receives a response message with media resource information from said second entity, in an IMS signaling message with media resource information each time sent to said first entity, the available media type in said media resource information is identical to the available media type in media resource information for said IP multimedia link S2.

Further, the above media negotiation method may further have the following characteristics:
said first entity is an entity having a gateway and a gateway control function, where the gateway control function part for performing message interaction with said AS is implemented by a mobile switch center enhanced (MSCe) or a media gateway control function (MGCF), and the media resource information of said first entity is media resource information of the gateway part;
said second entity is a second terminal, and said AS makes media resource information of said first entity included in a call message sent to said second terminal, and obtains the media resource information of said second terminal from a response message sent by said second terminal; media resource information of said first entity as included in said call message is media resource information of said first entity used for the IP multimedia link S2 as recorded by said AS during the call establishment between said first terminal and other terminal.

In order to solve the above technical problem, the present invention further provides a media negotiation method for an IP multimedia link, applicable to a process of establishing an IP multimedia link between a first entity and a second entity through an AS of an IMS, the media negotiation method comprising:

said AS sends an IMS re-invite message without media source information to said first entity;

said AS, after receiving an IMS signaling message with media resource information from said first entity, initializes and starts a timer, or initializes a counter for recording the number of the IMS signaling messages with media resource information which are retransmitted by said first entity, and sends an invite message with said media resource information to said second entity;

said AS, each time when timeout occurs to said timer or a count value of said counter reaches or exceeds a designated limit value, sends an IMS signaling message with media resource information to said first entity, and then further sends a re-invite message without media resource information to said first entity, and after receiving the IMS signaling message with media resource information from said first entity, initializes and starts said timer or initializes said counter; and said AS, after receiving a message with media resource information from said second entity before an answer message is received or receiving a response message with media resource information from said second entity, sends said first entity an IMS signaling message with the media source information returned by said second entity.

Further, the above media negotiation method may further have the following characteristics:

before said AS receives a message with media resource information from said second entity before an answer message is received or before said AS receives a response message with media resource information from said second entity, in an IMS signaling message with media resource information each time sent to said first entity, the available media type in said media resource information is identical to the available media type in media resource information used for said IP multimedia link S2.

Further, the above media negotiation method may further have the following characteristics:

when said AS receives a message with media resource information from said second entity before an answer message is received or receives a response message with media resource information from said second entity, if upon the latest time of receiving an IMS signaling message from said first entity, timeout has not occurred to the initialized and started timer, or upon the latest time of receiving an IMS signaling message from said first entity, a count value of the initialized counter has not reached or exceeded a designated limit value, then said AS directly sends said first entity an IMS signaling message with the media resource information returned by said second entity and stops timing or counting; otherwise, said AS, after receiving the IMS signaling message sent again by said first entity, further sends the IMS signaling message with the media resource information as returned by said second entity to said first entity, and will not initialize or start said timer any more, or will not initialize said counter any more;

wherein the timing time of said timer is shorter than the overtime of said first entity waiting for said AS to send an IMS signaling message with media resource information, and the designated limit value of said timer is smaller than or equal to the number of IMS signaling messages with media resource information which are retransmitted before said first entity waits overtime.

Further, the above media negotiation method may further have the following characteristics: the media negotiation method is triggered under the following circumstances:

a first terminal serviced by said first entity establishes a call link with other terminal via said AS firstly, said call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

Further, the above media negotiation method may further have the following characteristics:

the re-invite message without media resource information each time sent by said AS to said first entity includes a session identification of said IP multimedia link S2;

in the IMS signaling message with media resource information sent by said first entity to said AS, and in the invite message with media resource information sent by said AS to said second entity, said media resource information is media resource information of said first entity being used by said IP multimedia link S2.

Further, the above media negotiation method may further have the following characteristics:

said first entity is an entity having a gateway and a gateway control function, where the gateway control function part for performing message interaction with said AS is a mobile switch center enhanced (MSCe) or a media gateway control function (MGCF), and in the IMS signaling message with media resource information sent from said first entity, said media resource information is the media resource information of the gateway part in said first entity; and said second entity is a second terminal, wherein in the message with media resource information returned by said second entity before said second entity answers or in a response message with media resource information returned by said second entity, said media resource information is the media resource information of said second terminal.

Further, the above media negotiation method may further have the following characteristics:

the invite message with media resource information of said first entity sent from said AS to said second terminal is a call message, what is returned by said second terminal is a response message with said media resource information, and after receiving the response message from said second terminal, said AS further sends a response acknowledgement message to said second terminal; and the IMS signaling message with media resource information sent or re-sent by said MSCe or MGCF to said AS is a response message about the re-invite, and the IMS signaling message with media resource information sent by said AS to said MSCe or MGCF is a response acknowledgement message.

According to the method of the present invention for connecting a newly established media link with an existing CS media link, steps and time for re-negotiation after response are effectively reduced, and in particular, the steps and time for media re-negotiation between an AS and a terminal after the terminal responds are effectively reduced, thereby user experience is improved.

BRIEF DESCRIPTION OF THE DRAWINGS

in FIGS. 1 and 2:

–··–··–··– indicating circuit switch network signaling

– – – – indicating IMS network signaling

▬▬▬▬ indicating circuit switch network media

▬·▬·▬ indicating IMS network media

DETAILED DESCRIPTION

The technical solution of the present invention will be described in more detail hereinafter with reference to the drawings and embodiments.

Hereinafter, for the convenience of graph drawing and depiction, an AS and an S-CSCF are represented as a same entity, interaction between the two is carried out through a standard IMS signaling flow. An MGCF and an MGW are represented by an entity having a gateway and a gateway control function, the media resource information of the entity being the media resource information of the gateway part. The MGCF and the MGW are IMS network devices; and an entity corresponding to a CS network is an MSCe (responsible for processing IMS signaling and media data at the same time), or the entity comprises an MSCe (merely responsible for processing the IMS signaling) and an MGW. The dotted-line part in the figures indicates an action only occurring under a certain condition.

Figure 5:
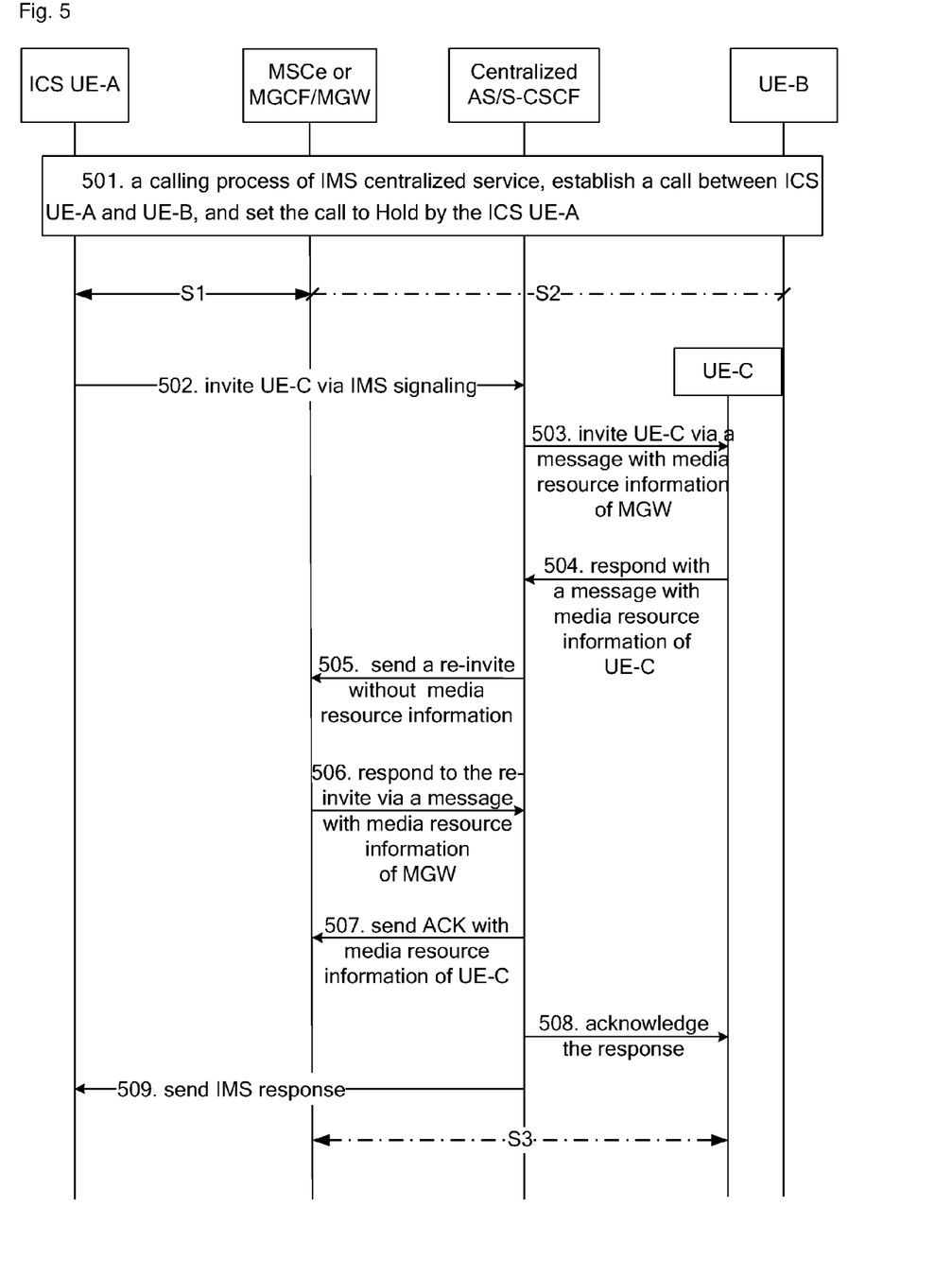
FIG. 5 shows a flow chart of an embodiment of an IMS centralized service implementing a three-party conference according to the present invention.

FIG. 5 shows a flow chart of an embodiment of an IMS centralized service implementing a three-party conference according to the present invention, which depicts a process of an ICS UE-A, after a call is established between the ICS UE-A and a UE-B, further initiating a call to a UE-C so as to establish a three-party conference, steps of which are specified as follows:

step 501: the ICS UE-A establishes a call connection with the UE-B according to a standard IMS centralized service process, the connection comprising two media links, one being a CS media link 51 between the ICS UE-A and the MSCe/MGW (referring to the MSCe or the MGW), and the other being a media link S2 between the MSCe/MGW and the UE-B; in order to initiate a new call, the ICS UE-A sets the call communicating with the UE-B to a hold state, which results in that the media link S2 has no media data to transmit;

step 502: the ICS UE-A sends a call message to the UE-C, for example sending an IMS INVITE message, the message passes through the S-CSCF which, according to a service trigger rule, forwards the message to a centralized AS, or sends similar signaling in a data field to the centralized AS;

subsequent steps 503-508 are a media negotiation process, and all signaling involved is IMS signaling;

step 503: the centralized AS finds that the calling user of the call is a terminal of the IMS centralized service and there already exists a call connection, and then the centralized AS sends a call message to the UE-C, for example sending an INVITE message, including MSCe/MGW media resource information related to the ICS UE-A as previously recorded, e.g., including the information in a message body; the call message reaches the UE-C via the S-CSCF;

since the centralized AS is on all session signaling paths of the ICS UE-A, during the process of the ICS UE-A establishing a call with the UE-B, the centralized AS can know all media resource information used by both parties, thereby the MSCe/MGW media resource information included in messages may be a combination of all media resource information recorded during the establishment of an existing call between the UE-A and UE-B, or may be MSCe/MGW media resource information used for S2 after completion of media negotiation of an existing call, or may be MSCe/MGW media resource information used for S2 before completion of media negotiation of an existing call, or may be MSCe/MGW media resource information obtained by changing a code list of each media type into a code list of each media type of initial MSCe/MGW media resource information based on the MSCe/MGW media resource information used for S2 after completion of media negotiation of an existing call;

step 504: the UE-C receives the call message, and the user, after response, returns a response message, for example, sending a "200 OK" message, including media resource information of the UE-C, for example, including the information in the message body; the message reaches the centralized AS via the S-CSCF;

step 505: after receiving the message of step 504, the centralized AS sends the MSCe/MGCF a re-invite message without media information, for example sending a re-INVITE message, the message including a session identification corresponding to the media link S2 and reaching the MSCe/MGCF via the S-CSCF;

step 506: the MSCe/MGCF receives the message of step 505 and sends a re-invite response message, for example sending a "200 OK" message, including the MSCe/MGW media resource information of the media link S2 in use; and the response message reaches the centralized AS via the S-CSCF;

step 507: the centralized AS sends a response acknowledgement message to the MSCe/MGCF, for example sending an ACK message, including the media resource information of the UE-C, e.g. including the information in the message body; the ACK message reaches the MSCe/MGCF via the S-CSCF, implementing media resource negotiation between the MSCe/MGCF and the UE-C, and the media link S2 is replaced with a new media link S3;

step 508: the centralized AS sends a response acknowledgement message to the UE-C, for example, sending an ACK message, the message reaching the UE-C via the S-CSCF;

step 509: the centralized AS sends a response message to the ICS UE-A according to a standard process, and the manner adopted is determined by the manner of receiving the call message in step 502.

The response acknowledgement message in the above step 508 and the response message in step 509 are sent after step 504, while the sequence among steps 505-507 and between 508 and 509 are not limited in the present invention, which may be carried out simultaneously.

According to the above flow, a call connection established between the ICS UE-A and the UE-C comprises two media links, one being an existing CS media link 51, the other being a new media link S3. Since the existing media link S2 is replaced with S3, the MSCe/MGCF/MGW can correctly connect 51 and S3.

In this embodiment, the AS firstly sends MGW media resource information (an SDP request) as previously recorded to the UE-C, and afterwards, makes a request for media resource information (an SDP request) from the MSCe/MGCF; since no new media resource information is provided to the MGCF, the media resource information used by the MSCe/MGW will not change, therefore it is unnecessary to send the MSCe/MGW media resource information to a new called party. After receiving media resource information of the new called party (an SDP response) and media resource information returned from the MSCe/MGCF, the AS sends the media resource information (SDP response) of the new called party to the MSCe/MGCF to complete negotiation, thereby effectively reducing steps and time of re-negotiation after response.

Figure 6:
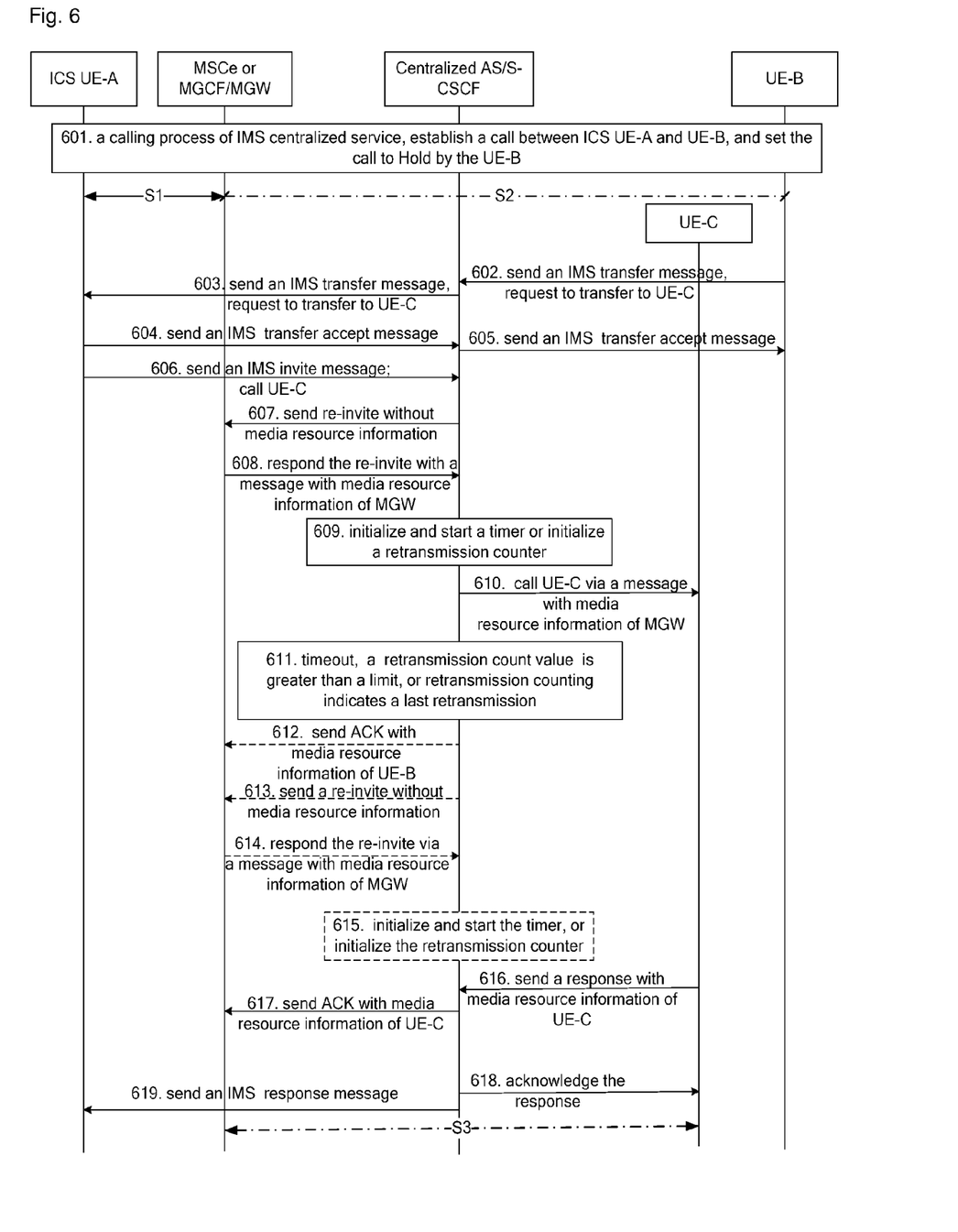
FIG. 6 shows a flow chart of an embodiment of an IMS centralized service implementing a communication transfer according to the present invention.

FIG. 6 shows a flow chart of an embodiment of an IMS centralized service implementing a transfer service, which depicts a process of transferring an ICS UE-A to a call communicating with a UE-C after a session is established between the UE-B and the ICS UE-A, steps of which are as follows:

step 601: the UE-B establishes a call connection with the ICS UE-A according to a standard IMS centralized service process, the connection comprising two media links, one being a CS media link S1 between the ICS UE-A and the MSCe/MGW, and the other being a media link S2 between the MSCe/MGW and the UE-B; in order to initiate a new call, the UE-B sets the call communicating with the ICS UE-A to a hold state, which results in that the media link S2 has no media data to transmit;

step 602: the UE-B executes an inquiry transfer service according to a standard IMS inquiry transfer service logic and sends an IMS transfer message to the ICS UE-A, for example sending a REFER message;

step 603: the transfer message reaches a centralized AS via the S-CSCF, and the centralized AS sends a transfer message to the ICS UE-A, for example sending a REFER message, or sending similar signaling in a data field;

steps 604-605: the ICS UE-A sends a transfer accept message, for example, sending an IMS "202 Accepted" message or sending similar signaling in a data field, and then the centralized AS sends an IMS "202 Accepted" message to the UE-B, the message finally reaching the UE-B via the S-CSCF;

step 606: the ICS UE-A sends an invite message, e.g. an IMS INVITE message, the target ("To" field) of the message being the transfer target ("Refer-To" field) of the transfer message, or sends similar signaling in a data field to the centralized AS;

subsequent steps 607-618 relate to a media negotiation process and all signaling involved is IMS signaling;

step 607: the centralized AS finds that the calling user of the call is a terminal of the IMS centralized service and there already exists a call connection, and then the centralized AS sends a re-invite message without media information to the MSCe/MGCF, e.g. a re-INVITE message which includes a session identification corresponding to the media link S2;

step 608: the MSCe/MGCF receives the message of step 607 and sends a re-invite response message, such as a "200 OK" message, including the MSCe/MGW media resource information of the media link S2 being in use; the response message reaches the centralized-service AS via the S-CSCF;

after sending the re-invite response message, the MSCe/MGCF will wait for a period of time for the response acknowledgement message, during this period of time, the MSCe/MGCF will constantly retransmit the re-invite response message according to a standard regulation, so as to guarantee reception of the counterpart, till it waits overtime;

step 609: after the centralized AS receives the message of step 608 (i.e., the re-invite response message sent from the MSCe/MGCF, the message sent from the MSCe/MGCF herein does not include the retransmitted message), in order to prevent session termination due to overtime of the MSCe/MGCF waiting for the response message, the AS initializes and starts a timer, where the timing time of the timer is shorter than the standard overtime of the MSCe/MGCF waiting for a response acknowledgement message, so as to guarantee that the MSCe/MGCF can timely receive the response acknowledgement message returned from the AS, or the AS initializes a counter, so that the AS can return a response acknowledgement message after receiving a retransmitted message with a designated limit value, where the designated limit value should be less than equal to the number of re-invite response messages retransmitted before the MSCe/MGCF waits overtime, so as to guarantee that the MSCe/MGCF will not wait overtime, and afterwards, each time the centralized AS receives a retransmitted message, 1 is added to the counter;

step 610: the centralized AS sends a call message to the UE-C, for example sending an INVITE message, including the media resource information in the message sent from the MSCe/MGCF in step 608, for example including the information in the message body; the call message reaches the UE-C via the S-CSCF;

the sequence of the above steps 609 and 610 are not limited in the present invention, which may be implemented simultaneously.

step 611: if the UE-C spends too much time waiting for the user to respond to the call, it will result in that timeout will occur to the timer in step 609, or a count value of the counter in step 609 reaches or exceeds the designated limit value;

step 612: in order to prevent the MSCe/MGCF from waiting overtime for a response acknowledgement message, the centralized-service AS sends, if the condition of step 611 is satisfied, a response acknowledgement message to the MSCe/MGCF, for example sending an ACK (acknowledgement) message, including the media resource information of the UE-B used for the media link S2, or other media resource information in which available media resource type is identical to that in the media resource information used for the media link S2, for example the AS generates one by itself and makes it included in the message body; since the available media resource type does not change, the MSCe/MGCF will not change the media resource information used for the media link S2;

steps 613-615: after sending the response acknowledgement message, the centralized-service AS and the MSCe/MGCF repetitively perform steps 607-609;

step 616: a user of the UE-C answers the call, so that the UE-C returns a response message, for example, sending a "200 OK" message, including media resource information of the UE-C, e.g., including the information in the message body; the message reaches the centralized AS via the S-CSCF;

step 617: when the centralized AS receives the message of step 616, if upon the latest time of receiving the re-invite response message, timeout has not occurred to the initialized and started timer, or a count value of the initialized counter has not reached or exceeded a designated limit value, then the centralized AS directly sends a response acknowledgement message to the MSCe/MGCF and stops timing or counting; otherwise, the centralized AS needs to, after receiving the re-invite response message sent again by the MSCe/MGCF, send a response acknowledgement message to the MSCe/MGCF (meanwhile, not initializing and starting the timer or initializing the counter any longer, and stopping timing or counting), for example, sending an ACK message, including the media resource information of the UE-C, e.g. including the information in the message body; the message reaches the MSCe/MGCF via the S-CSCF, implementing media resource negotiation between the MSCe/MGCF and the UE-C, and the media link S2 is replaced with a new media link S3;

step 618: the centralized AS sends a response acknowledgement message to the UE-C, for example sending an ACK message, the message reaching the UE-C via the S-CSCF;

step 619: the centralized AS sends a response message to the ICS UE-A according to a standard process, and the manner adopted is determined by the manner of receiving the invite message in step 606.

The sequence of the above steps 619, 617, and 618 is not limited in the present invention, which may be performed simultaneously.

According to the above flow, the call connection between the ICS UE-A and the UE-C comprises two media link, one being an existing CS media link S1, the other being a new media link S3; the existing media link S2 is replaced by S3; thus the MSCe/MGCF/MGW can correctly connect S1 and S3.

The solution of the present embodiment as shown in FIG. 6 differs from the solution of the embodiment as shown in FIG. 5 in that: in FIG. 6, the AS firstly sends a re-invite message without media information to the MSCe/MGCF, and after obtaining media resource information used for the media link S2 returned from the MSCe/MGCF, sends the media resource information via the call message to the UE-C; however, in FIG. 5, the AS firstly sends the UE-C the media resource information as recorded during the call between the ICS UE-A and UE-B. According to the solution in FIG. 6, it is not necessary for the AS to record media resource information used by the MSCe/MGW during the previous call establishment between the ICS UE-A and the UE-B, thereby saving resources. Further, since what is sent to the UE-C in FIG. 6 is just the media resource information of the MSCe/MGW being used for the media link S2, the success rate of call establishment can be improved.

Figure 7:
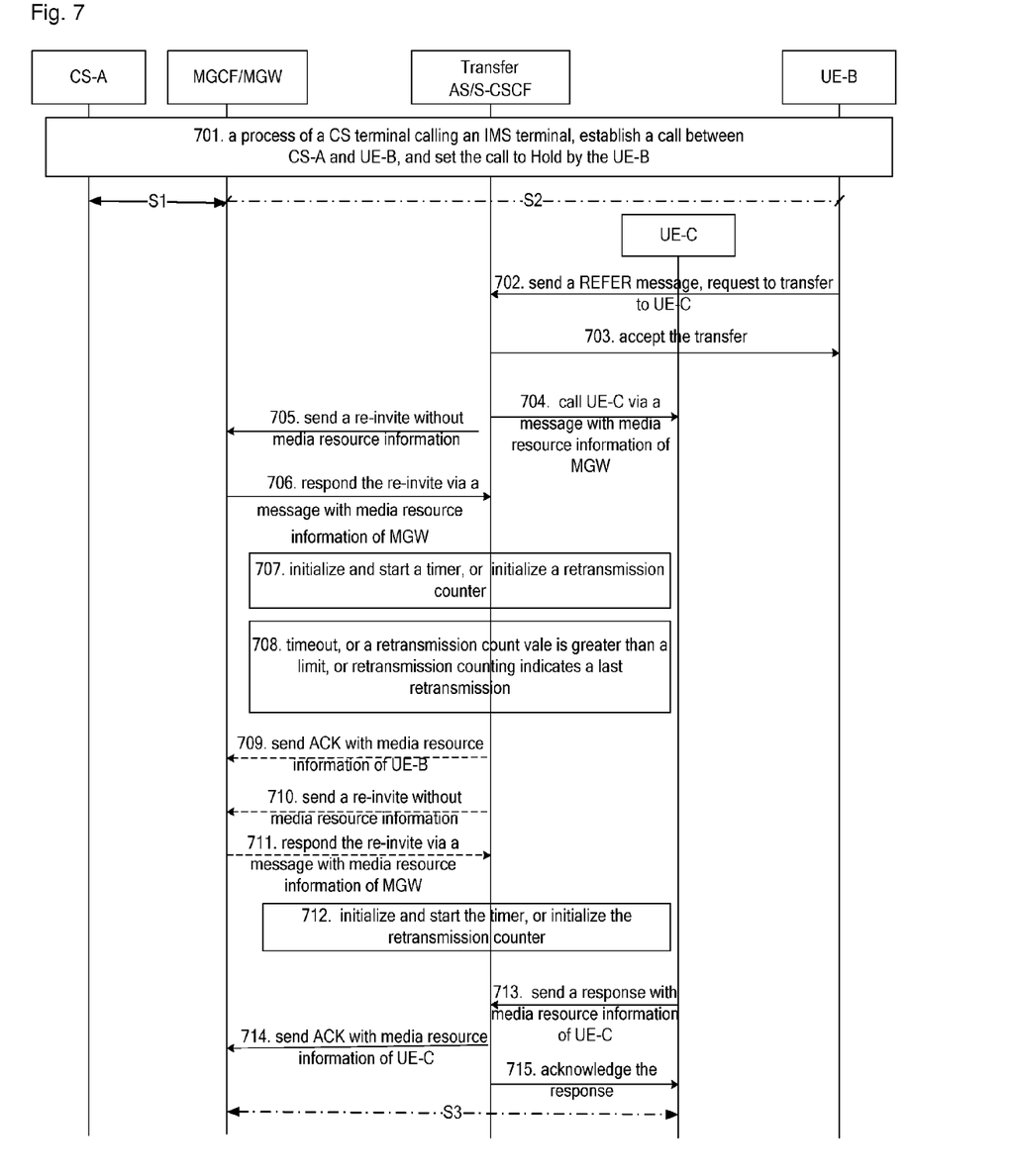
FIG. 7 shows a flow chart of another embodiment of an IMS centralized service implementing a communication transfer according to the present invention.

FIG. 7 shows a flow chart of an IMS centralized service implementing a communication transfer according to another embodiment of the present invention, which depicts a process that a UE-B transfers a CS-A to a call connecting with a UE-C after a call is established between the CS-A and the UE-B, steps of which are as follows:

step 701: the UE-B establishes a call connection with the CS-A according to a standard IMS call process, the connection comprising two media link, one being a CS media link S1 between the CS-A and the MGW, the other being a media link S2 between the MGW and the UE-B; in order to initiate a new call, the UE-B sets the call connecting with the CS-A to a hold state, so that the media link S2 has no media data to transmit;

step 702: the UE-B sends a transfer request to the CS-A, for example, sending a REFER (transfer) message, to request the CS-A to call the UE-C, for example, setting a value of the "Refer-To" header of the transfer message to the identification of the UE-C, the message reaching a transfer AS via the S-CSCF;

subsequent steps 703-708 relate to a media negotiation process, and all involved signaling is IMS signaling;

step 703: the transfer AS determines that a recipient for the transfer request is a CS network terminal, and then returns a transfer accept message to the UE-B, for example, sending a "202 Accepted" message, the message reaching the UE-B via the S-CSCF;

step 704: the transfer AS sends a call message to the UE-C, for example sending an INVITE message, including MGW media resource information related to the CS-A as previously recorded, e.g. including the information in the message body; the call message reaches the UE-C via the S-CSCF;

the meaning of the MGW media resource information related to the CS-A as previously recorded may refer to the content in step 503;

step 705: the transfer AS sends a re-invite message without media information to the MGCF, for example sending a re-INVITE message, the message reaching the MGCF via the S-CSCF; and the re-INVITE message may include a session identification corresponding to the media link S2;

the sequence of the above steps 704 and 705 is not limited in the present invention, they may be implemented simultaneously; what is different from FIG. 5 is that the transfer AS can send the above re-invite message to the MGCF without need of waiting for reception of a response to the call message from the UE-C;

step 706: the MGCF sends a re-invite response message, for example sending a "200 OK" message, including the MGW media resource information used of the media link S2 being in use; the message reaches the transfer AS via the S-CSCF;

after sending a re-invite response message, the MGCF will wait for a period of time for a response acknowledgement message till it waits overtime, during this waiting period of time, the MGCF will constantly retransmit the re-invite response message according to a standard regulation, so as to guarantee that the counterpart can receive the message;

step 707: after the transfer AS receives the message of step 706 (i.e., the re-invite response message sent from the MGCF), in order to prevent session termination due to overtime of the MGCF waiting for the response acknowledgement message, the transfer AS initializes and starts a timer, where the timing time of the timer is shorter than the standard overtime for the MGCF waiting for a response acknowledgement message, so as to guarantee that the MGCF can timely receive the response acknowledgement message returned from the AS, or the transfer AS initializes a counter, so that the transfer AS can return a response acknowledgement message after receiving a retransmitted message with a designated limit value, where the designated limit value should be less than or equal to the number of re-invite response messages retransmitted before the MSCe/MGCF waits overtime, so as to guarantee that waiting overtime will not occur to the MGCF, and afterwards, each time the transfer AS receives a retransmitted message, 1 is added to the counter;

step 708: if the UE-C spends too much time waiting for a user to respond to the call, it will result in that timeout will occur to the timer in step 707, or a count value of the counter in step 707 will reach or exceed the designated limit value;

step 709: in order to prevent the MGCF from waiting overtime for the response acknowledgement message, the transfer AS sends, if the condition of step 708 is satisfied, a response acknowledgement message to the MGCF, for example sending an ACK (acknowledgement) message, which may include the media resource information of the UE-B used for the media link S2, or other media resource information which has the same available media resource type as the media resource information used for the media link S2 has, for example including the information in the message body; the message reaches the MGCF via the S-CSCF; since the available media resource type does not change, the MGW will not change the media resource information used for the media link S2;

steps 710-712: meanwhile, the transfer-service AS repetitively performs steps 705-707;

step 713: a user of the UE-C answers the call, so that the UE-C returns a response message, for example, sending a "200 OK" message, including media resource information of the UE-C, e.g., including the information in the message body; the message reaches the transfer-service AS via the S-CSCF;

step 714: when the transfer AS receives the response message of step 713, if upon the latest time of receiving the re-invite response message, timeout has not occurred to the initialized and started timer, or the count value of the initialized counter has not reached or exceeded a designated limit value, then the transfer AS directly sends a response acknowledgement message to the MGCF; otherwise, it is necessary for the transfer AS to, after receiving the re-invite response message sent again by the MGCF, send a response acknowledgement message to the MGCF (but, not to initialize and start the timer or initialize the counter any longer), for example, sending an ACK message, including the media resource information of the UE-C, for example including it in the message body; the message reaches the MGCF via the S-CSCF, implementing media resource negotiation between the MGCF and the UE-C, and the media link S2 is replaced with a new media link S3;

step 715: the transfer AS sends a response acknowledgement message to the UE-C, for example, sending an ACK message, and the message reaches the UE-C via the S-CSCF.

The above step 715 is performed after step 713, and the sequence of the step 715 and step 714 is not limited in the present invention, which may be performed simultaneously.

According to the above flow, a call connection established between the CS-A and the UE-C comprises two media links, one being an existing CS media link 51, the other being a new media link S3. Since the existing media link S2 is replaced by S3, the MGCF/MGW can correctly connect 51 and S3.

Further, it should be noted that the substantive difference among the solutions corresponding to FIGS. 5 and 6 and 7 does not lie in that one is for establishing a three-party conference, one is for implementing an ICS transfer service, and one is for implementing an IMS transfer service, but lies in that their media resource information negotiation processes for implementing connection between an existing CS link and an IP multimedia link are different. The media resource negotiation process (media resource information inter-transmission) as implemented in steps 503-508 of FIG. 5, the media resource information negotiation process as implemented in steps 607-618 of FIG. 6, and the media negotiation process as implemented in steps 704-715 of FIG. 7 can be mutually replaceable so as to obtain more embodiments. The present invention is not limited to the above three application scenarios, it is unnecessary to enumerate every possible application scenario herein, and any media resource information negotiation process implementing connection between an existing media link (not limited to a CS link, which even may be an IMS media link) and an IP multimedia link can use a method according to the present invention.

Further, different specific SIP messages are used in different application scenarios, while the focus of the present invention is the establishment of a media link, thus what SIP signaling is used is not necessarily limited in a media resource information negotiation process. For example, after an MSCe/MGCF receives a re-invite message, it may also return a provisional response message including the media resource information of the MSCe/MGW used for S2, while an AS, after receiving the provisional response message, may send the media resource information of a UE-C to the MSCe/MGCF via a pre-acknowledgement message or an update message.

The media negotiation process of the present invention is not limited between a MSCe/MGCF and a terminal, it may be used in a process of establishing an IP multimedia link between two entities. Further, segmentation may exist during the IP multimedia link establishment between two entities, for example, a terminal C may be connected to an AS via an MGCF, thus, the media resource information transmitted via the AS might be not the media resource information of the first entity or of the second entity, but the media resource information of an intermediary device; and so forth.

Further, as to the media negotiation between the AS and the terminal C, in the embodiments, the media resource information of the MSCe/MGCF is sent to the terminal C through a call message (an invite message), and the media resource information of the terminal C is returned to the AS through a message responding to the call message. But it is not necessarily so, for example, the terminal C may also return its own media resource information to the AS through a provisional response message. Herein, as long as the terminal C returns media resource information to the AS through a message before it answers or via a response message, the effect of reducing steps of media negotiation between the AS and the terminal after response can be achieved.

Of course, the present invention may have other embodiments. Without departing from the spirit and essence of the present invention, those skilled in the art can make various corresponding changes and alterations according to the present invention, but such corresponding changes and alterations shall fall within the scope of the appended claims.

INDUSTRIAL PRACTICABILITY

The media negotiation method for an IP multimedia link according to the present invention is applicable to a process of establishing an IP multimedia link between a first entity and a second entity through an AS of an IMS, thereby effectively reducing steps and time required after response for re-negotiation.

What is claimed is:

1. A media negotiation method for an IP multimedia link, applicable to a process of establishing an IP multimedia link between a first entity and a second entity through an application server (AS) of an IP multimedia subsystem (IMS), the media negotiation method comprising:

said AS sending the second entity an invite message, which includes SDP content of said first entity, and sending said first entity an IMS re-invite message without SDP content;

said AS, after receiving an IMS signaling message with SDP content from said first entity, and if either a message with SDP content before an answer message is received or a response message with SDP content from said second entity is not received within a specific time or within a specific retransmitted number of said IMS signaling messages with SDP content returned by said first entity, sending an IMS signaling message with SDP content to said first entity, and then further sending a re-invite message without SDP content to said first entity; and said AS, after receiving a message with SDP content from said second entity before an answer message is received or receiving a response message with SDP content from said second entity, sending said first entity an IMS signaling message with the SDP content returned by said second entity.

2. The media negotiation method according to claim 1, wherein

When, within a specific time or within a specific retransmitted number of said IMS signaling messages with SDP content returned by said first entity, said AS receives the message with SDP content from said second entity before an answer message is received or receives the response message with SDP content from said second entity, then said AS directly sends said first entity an IMS signaling message with the SDP content returned by said second entity; otherwise, said AS, after receiving the IMS signaling message with SDP content sent again by said first entity, sends said first entity the SDP content returned by said second entity;

wherein said specific time is shorter than an overtime of said first entity waiting for said AS to send an IMS signaling message with SDP content, and the retransmitted number is smaller than or equal to the number of IMS signaling messages with SDP content retransmitted before said first entity waits overtime.

3. The media negotiation method according to claim 1, wherein said media negotiation method is triggered under the following conditions:

a first terminal serviced by said first entity firstly establishes a call link with other terminal via said AS, the call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

4. The media negotiation method according to claim 3, wherein the re-invite message without SDP content each time sent by said AS to said first entity includes a session identification of the IP multimedia link S2; and before said AS receives a message with SDP content from said second entity before an answer message is received or receives a response message with SDP content from said second entity, in an IMS signaling message with SDP content each time sent to said first entity, the available media type in said SDP content is identical to the available media type in SDP content used for the IP multimedia link S2.

5. The media negotiation method according to claim 3, wherein said first entity is an entity having a gateway and a gateway control function, where the gateway control function part for performing message interaction with said AS is implemented by a mobile switch center enhanced (MSCe) or a media gateway control function (MGCF), and the SDP content of said first entity is SDP content of the gateway part; and said second entity is a second terminal, and said AS makes SDP content of said first entity included in a call message sent to said second terminal, and obtains the SDP content of said second terminal from a response message sent by said second terminal; SDP content of said first entity as included in said call message is SDP content of said first entity used for the IP multimedia link S2 as recorded by said AS during the call establishment between said first terminal and said other terminal.

6. A media negotiation method for an IP multimedia link, applicable to a process of establishing an IP multimedia link between a first entity and a second entity through an application server (AS) of an IP multimedia subsystem (IMS), the media negotiation method comprising:

said AS sending an IMS re-invite message without SDP content to said first entity;

said AS, after receiving an IMS signaling message with SDP content from said first entity, sending an invite message with said SDP content to said second entity;

said AS, if a response message with SDP content from said second entity is not received within a specific time or within a specific retransmitted number of said IMS signaling messages with SDP content returned by said first entity, sending an IMS signaling message with SDP content to said first entity, and then further sending a re-invite message without SDP content to said first entity; and said AS, after receiving a response message with SDP content from said second entity, sending said first entity an IMS signaling message with the SDP content returned by said second entity.

7. The media negotiation method according to claim 6, wherein before said AS receives a message with SDP content from said second entity before an answer message is received or receives a response message with SDP content from said second entity, in an IMS signaling message with SDP content each time sent to said first entity, the available media type in said SDP content is identical to the available media type in the SDP content used for an IP multimedia link S2.

8. The media negotiation method according to claim 7, wherein
when said AS receives a message with SDP content from said second entity before an answer message is received or receives a response message with SDP content from said second entity, said AS directly sends said first entity an IMS signaling message with the SDP content returned by said second entity; otherwise, after receiving the IMS signaling message sent again by said first entity, said AS further sends said first entity the IMS signaling message with the SDP content returned by said second entity;
wherein said specific time is shorter than an overtime of said first entity waiting for said AS to send an IMS signaling message with SDP content, and said specific retransmitted number is smaller than or equal to the number of IMS signaling messages with SDP content that are retransmitted before said first entity waits overtime.

9. The media negotiation method according to claim 6, wherein said media negotiation method is triggered under the following conditions:
a first terminal serviced by said first entity firstly establishes a call link with other terminal via said AS, the call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

10. The media negotiation method according to claim 9, wherein
the re-invite message without SDP content each time sent by said AS to said first entity includes a session identification of the IP multimedia link S2; and
in the IMS signaling message with SDP content sent by said first entity to said AS, and in the invite message with SDP content sent by said AS to said second entity, said SDP content is SDP content of said first entity being used by the IP multimedia link S2.

11. The media negotiation method according to claim 6, wherein
said first entity is an entity having a gateway and a gateway control function, where the gateway control function part for performing message interaction with said AS is a mobile switch center enhanced (MSCe) or a media gateway control function (MGCF), and in the IMS signaling message with SDP content sent by said first entity, said SDP content is the SDP content of the gateway part in said first entity; and
said second entity is a second terminal, where in the message with SDP content returned by said second entity before said second entity answers or in a response message with SDP content returned by said second entity, said SDP content is the SDP content of said second terminal.

12. The media negotiation method according to claim 11, wherein
the invite message with SDP content of said first entity sent by said AS to said second terminal is a call message, what is returned by said second terminal is a response message with SDP content, and after receiving the response message from said second terminal, said AS further sends a response acknowledgement message to said second terminal; and
the IMS signaling message with SDP content sent or re-sent by said MSCe or MGCF to said AS is a response message about the re-invite, and the IMS signaling message with SDP content sent by said AS to said MSCe or MGCF is a response acknowledgement message.

13. The media negotiation method according to claim 2, wherein said media negotiation method is triggered under the following conditions:
a first terminal serviced by said first entity firstly establishes a call link with other terminal via said AS, the call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

14. The media negotiation method according to claim 13, wherein
the re-invite message without SDP content each time sent by said AS to said first entity includes a session identification of the IP multimedia link S2; and
before said AS receives a message with SDP content from said second entity before an answer message is received or receives a response message with SDP content from said second entity, in an IMS signaling message with SDP content each time sent to said first entity, the available media type in said SDP content is identical to the available media type in SDP content used for the IP multimedia link S2.

15. The media negotiation method according to claim 13, wherein
said first entity is an entity having a gateway and a gateway control function, where the gateway control function part for performing message interaction with said AS is implemented by a mobile switch center enhanced (MSCe) or a media gateway control function (MGCF), and the SDP content of said first entity is SDP content of the gateway part; and
said second entity is a second terminal, and said AS makes SDP content of said first entity included in a call message sent to said second terminal, and obtains the SDP content of said second terminal from a response message sent by said second terminal; SDP content of said first entity as included in said call message is SDP content of said first entity used for the IP multimedia link S2 as recorded by said AS during the call establishment between said first terminal and said other terminal.

16. The media negotiation method according to claim 7, wherein said media negotiation method is triggered under the following conditions:
a first terminal serviced by said first entity firstly establishes a call link with other terminal via said AS, the call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

17. The media negotiation method according to claim 8, wherein said media negotiation method is triggered under the following conditions:
   a first terminal serviced by said first entity firstly establishes a call link with other terminal via said AS, the call link comprising an IP multimedia link S2 between said first entity and said other terminal, afterwards, said first terminal further calls said second entity via said AS so as to establish a three-party conference, or said other terminal initiates an IMS transfer service or a transfer service in an IMS centralized service to said second entity via said AS, and replaces said IP multimedia link S2 with an IP multimedia link between said first entity and said second entity, thereby triggering said AS to perform said media negotiation.

18. The media negotiation method according to claim 16, wherein
   the re-invite message without SDP content each time sent by said AS to said first entity includes a session identification of the IP multimedia link S2; and
   in the IMS signaling message with SDP content sent by said first entity to said AS, and in the invite message with SDP content sent by said AS to said second entity, said SDP content is SDP content of said first entity being used by the IP multimedia link S2.

19. The media negotiation method according to claim 17, wherein
   the re-invite message without SDP content each time sent by said AS to said first entity includes a session identification of the IP multimedia link S2; and
   in the IMS signaling message with SDP content sent by said first entity to said AS, and in the invite message with SDP content sent by said AS to said second entity, said SDP content is SDP content of said first entity being used by the IP multimedia link S2.

20. The media negotiation method according to claim 6, further comprising:
   said AS, if either a message with SDP content before an answer message is received, sending an IMS signaling message with SDP content to said first entity, and then further sending a re-invite message without SDP content to said first entity; and
   said AS, after receiving a message with SDP content from said second entity before an answer message is received, sending said first entity an IMS signaling message with the SDP content returned by said second entity.

\* \* \* \* \*